Feb. 28, 1933.   O. E. FISHBURN   1,899,500

OVERRUNNING CLUTCH MECHANISM

Filed April 25, 1931

Inventor
Otto E. Fishburn,
By Hood + Hahn.
Attorneys

Patented Feb. 28, 1933

1,899,500

UNITED STATES PATENT OFFICE

OTTO E. FISHBURN, OF MUNCIE, INDIANA, ASSIGNOR, BY MESNE ASSIGNMENTS, TO FREE WHEELING PATENTS CORPORATION, OF SOUTH BEND, INDIANA, A CORPORATION OF DELAWARE

OVERRUNNING CLUTCH MECHANISM

Application filed April 25, 1931. Serial No. 532,766.

My invention relates to improvements in automobile transmissions and particularly to that type of automobile transmission which has become commercially known as a "free wheel" transmission. In this type of transmission means are provided whereby in event the driven shaft is operated, through momentum of the vehicle or for other reasons, at a greater speed than that of the speed of the engine or driving shaft the two shafts will become disconnected thereby permitting the driven shaft to operate independently of the driving shaft.

It is one of the objects of my invention to provide a simplified form of clutch mechanism, whereby the above result may be obtained and whereby at the same time, when desired, the "free wheeling" may be "locked out" and the two shafts connected together irrespective of the relative direction of operation of either.

Other advantages and features of novelty will appear more fully in the appended specification and claims.

For the purpose of disclosing my invention, I have illustrated one embodiment of the invention in the accompanying drawing, in which.

Figure 1:
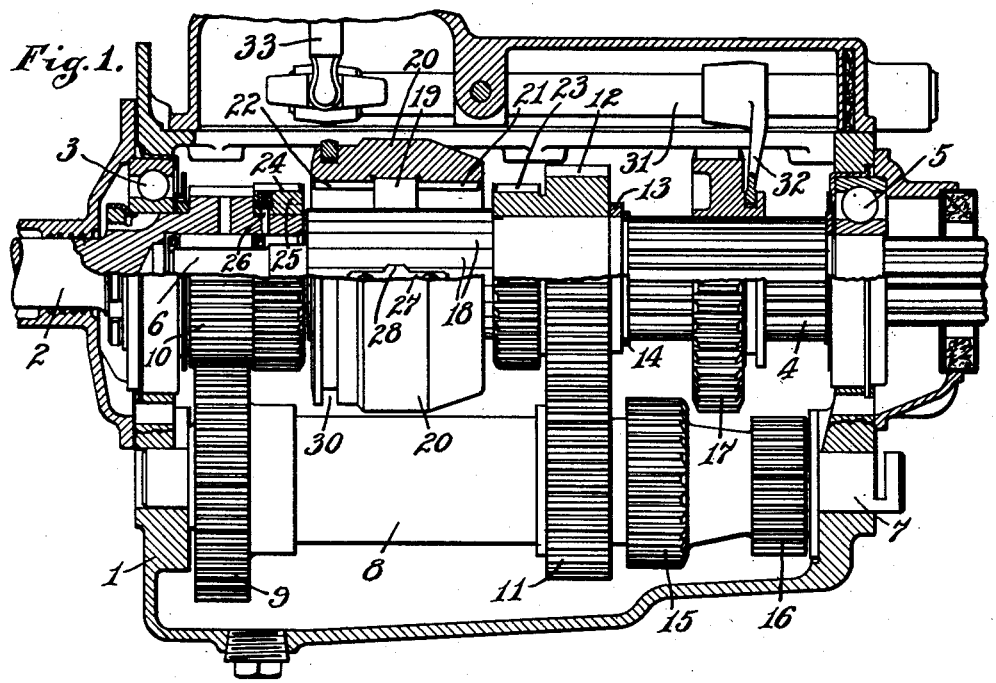
Fig. 1 is a longitudinal sectional view of a transmission embodying my invention.

In the embodiment of the invention illustrated the transmission casing 1 has extended thereinto the driving shaft 2, supported in suitable ball bearings 3 in the end wall of the casing and a driven shaft 4 supported in suitable ball bearings 5 in the opposite end wall of the casing. The driven shaft 4 is piloted as at 6 in the driving shaft 2 being in axial alignment therewith. Below the shafts 2 and 4 is provided a counter-shaft 7 having thereon a spindle 8 provided at one end with a gear 9 in constant mesh with a gear 10 fixed on the shaft 2. This spindle 8 is also provided with a gear 11 in constant mesh with a gear 12 rotatably mounted on the shaft 4. The gear 12 is held against axial displacement in one direction by a locking ring 13 secured in position by a lock member 14 and against axial displacement in the opposite direction by an enlarged portion of the shaft 4 which will be more fully hereinafter described.

In addition to the gears 9 and 11 the spindle 8 is provided with a gear 15 and a gear 16. The gear 16 is in constant mesh with an idler (not shown) and the idler and the gear 15 being adapted to be meshed by a gear 17 splined on the shaft 4 for reverse drive when meshed with the idler and low or first speed drive when meshed with the gear 15. The gear 11 provides for second speed drive.

The shaft 4 is provided with an enlarged barrel having extending longitudinally thereof, a plurality of double cammed surfaces 18 adapted to receive locking rollers 19. These rollers cooperate with an outer annular axially shiftable ring 20 to provide a clutch and the rollers are so arranged in the ring 20 as to shift therewith. This ring 20 is provided on its inner periphery with teeth 21 and a second set of teeth 22, the material between these teeth being cut out to form a groove to receive the rollers 19 so that these rollers will be axially shifted with the ring. The teeth 21 of the ring 20 are adapted to engage teeth 23 on the hub of the gear 12 and the teeth 22 are adapted to mesh with teeth 24 on the end of the shaft 2. These teeth are preferably formed in a separate ring 25 which is provided with inter-engaging teeth formed on the shaft 2 to be rotatably locked therewith and is held against axial displacement by a series of set pins 26.

Figure 3:
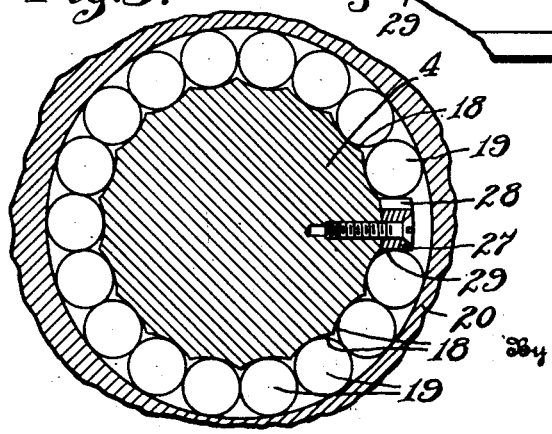
Fig. 3 is a sectional view on the line 3—3 of Fig. 2.

A locking plate 27 is mounted on the clutch barrel portion intermediate of its ends and this plate is provided, intermediate of its ends, with a widened portion 28. This plate 27 lies between two of the series of rollers 19 and when the rollers are in a position opposite the widened portion 28 they are maintained at the lowermost point of the double cammed surfaces whereby the ring 20 is free to rotate independently of the barrel portion. When the ring 20 is moved to the right, looking at Fig. 1, the teeth 21 and 23 are first meshed, which meshing may be accomplished readily as the ring member 20 is comparatively light and free to rotate. A continued movement to the right with the teeth 21 and 23 in mesh moves the rollers 19 beyond the widened portion 28 of the lock plate 27. This then releases the rollers to such an extent that they may ride up one of the cammed surfaces, looking at Fig. 3, the right hand surface or rather the surface in a clockwise direction. However, any tendency of the rollers 19 to move in a reverse direction is blocked by the edge 29 of the plate 27. Therefore, by this arrangement, the gear 12 is connected to the shaft 4 by a unidirectional clutch in such a manner that when the shaft 2 is the driving member the shafts 2 and 4 will be connected. If for a reason the shaft 4 becomes the driving member the rollers will roll down the cammed surface towards the bottom but will be prevented from rolling up the cammed surface by the edge 29 so that, the shafts 2 and 4 are disconnected.

If the ring 20 be moved further to the right until the rollers 19 clear the plate 27 completely, the teeth 21 and 23 being still in mesh, the gear 12 is connected to the shaft 4 by a bidirectional clutch, as it will be seen that there is nothing to restrain the rollers 19 from riding up either of their cammed surfaces depending upon the direction of relative rotation between the shafts 4 and 2. In this manner the "free wheeling" feature of the transmission is locked out.

Figure 2:
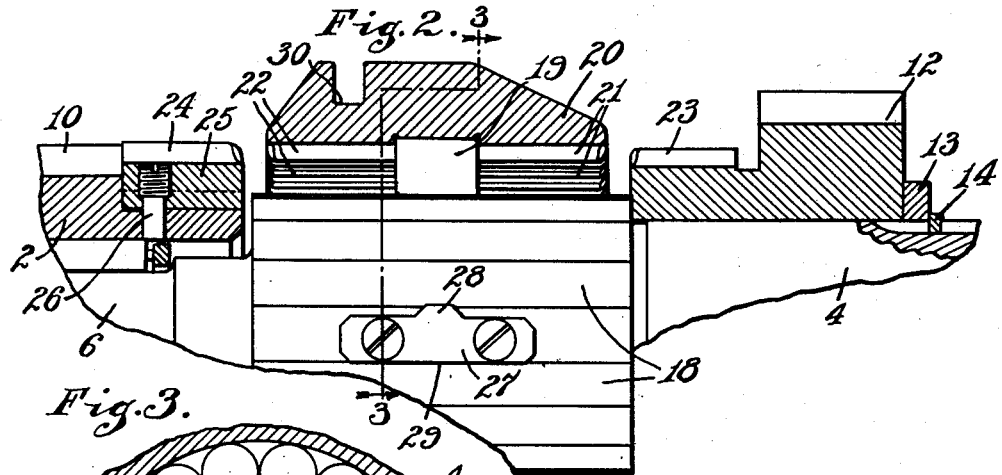
Fig. 2 is an enlarged detail longitudinal section of the clutching mechanism.

It is obvious that when the ring 20 is moved to the left, looking at Figs. 1 and 2, the teeth 22 and 24 will be engaged directly connecting the shafts either through a unidirectional clutch or bidirectional clutch depending upon the extent of movement of the member 20 in the same manner as has ben described with respect to the gear 12.

This member 20 is provided with an annular groove 30 adapted to receive a shifting fork mounted on a shifter rod similar to the shifting rod 31 carrying the shifter form 32. The shifter fork 32 engages the gear 17 for axially shifting this member and both shifter rods are operated by a suitable shift lever 33.

I claim as my invention:

1. In a device of the character described, the combination with a driving member and a driven member, of means for connecting said members comprising a clutch including a clutch member on one of said members, having a plurality of oppositely disposed wedging surfaces, a plurality of rollers cooperating with said surfaces, a stop on said clutch member preventing movement of said rollers into wedging engagement with the wedging surfaces, a second stop on said member for preventing movement of the rollers into wedging engagement with said wedging members in one direction and a second clutch member with which said rollers cooperate to lock the clutch members together and having means for connecting it with the other of the driving or driven members and means for operatively moving said rollers relatively to said stops.

2. In a device of the character described, the combination with a driving member and a driven member, of means for connecting said members comprising a clutch including a clutch member on one of said members, having a plurality of oppositely disposed wedging surfaces, a plurality of rollers cooperating with said wedging surfaces, a stop on said clutch member preventing the movement of said rollers into wedging engagement with the wedging surfaces, a second stop on said member for preventing movement of the rollers into wedging engagement with the surfaces in one direction and a second clutch member with which said rollers cooperate to lock the clutch members together and having means for connecting said clutch member with the other of the driving or driven members and means for progressively and operatively moving said rollers relatively to said surfaces.

3. In a device of the character described, the combination with a driving member and a driven member, of means for connecting said members comprising a clutch including a clutch member on one of said members, having a plurality of oppositely disposed wedging surfaces, a plurality of rollers cooperating with said wedging surfaces, a stop on said clutch member for preventing movement of said rollers into wedging engagement with said wedging surfaces, a second stop of said member for preventing movement of the roller members into wedging engagement with said wedging surfaces in one direction, a second clutch member surrounding said rollers and with which said rollers cooperate to lock the two clutch members together and axially movable relatively to the first clutch member, said second clutch member having means for driving engagement with the other of said driving or driven members and means for progressively moving said rollers operatively relatively to said stop members.

4. In a device of the character described, the combination with a driving member and a driven member, of means for connecting said members comprising a clutch including a clutch member on one of said members, having a plurality of oppositely disposed wedging surfaces, a plurality of rollers cooperating with said wedging surfaces, a stop on said clutch member for preventing movement of said rollers into wedging engagement with either of said wedging surfaces, a second stop on said clutch member for preventing movement of the roller members into engagement with one of said wedging surfaces, a second clutch member with which said rollers cooperate to lock the two clutch members together and axially movable into clutching engagement with the other of said driving or driven members and adapted when in one of its engaged positions to move the rollers from engagement with one of said stops and in another engaged position to move the rollers from the engagement with other stops.

5. In a device of the character described, the combination with a driving member and a driven member, of means for connecting said members comprising a bidirectional roller clutch, the members of which are relatively axially movable, means on one of said members for preventing the operation of the rollers and other means for preventing the operation of the rollers in one direction, said rollers being movable with the axially movable member out of the influence of the first mentioned means to render said clutch a unidirectional clutch and then out of the influence of the second mentioned means to render said clutch a bidirectional clutch.

In witness whereof I, OTTO E. FISHBURN, have hereunto set my hand at Muncie, Indiana, this 15th day of April, A. D. one thousand nine hundred and thirty-one.

OTTO E. FISHBURN.